United States Patent
Li (10) Patent No.: US 12,126,938 B2
(45) Date of Patent: Oct. 22, 2024

(54) IMAGE PROCESSING METHOD AND APPARATUS, DEVICE AND STORAGE MEDIUM

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 226 days.

(21) Appl. No.: 17/652,383

(22) Filed: Feb. 24, 2022

(65) Prior Publication Data

US 2022/0182582 A1    Jun. 9, 2022

Related U.S. Application Data

(63) Continuation of application No. PCT/CN2020/123056, filed on Oct. 23, 2020.

(30) Foreign Application Priority Data

Aug. 29, 2019    (CN) .......................... 201910810698.6

(51) Int. Cl.
    H04N 7/18      (2006.01)
    H04N 5/262     (2006.01)
    H04N 5/272     (2006.01)

(52) U.S. Cl.
    CPC ........... *H04N 7/181* (2013.01); *H04N 5/2628* (2013.01); *H04N 5/272* (2013.01)

(58) Field of Classification Search
    CPC ...... H04N 7/181; H04N 5/2628; H04N 5/272; H04N 23/45; H04N 7/185; H04N 5/45
    See application file for complete search history.

(56) References Cited

U.S. PATENT DOCUMENTS

| | | | |
|---|---|---|---|
| 10,607,310 B1* | 3/2020 | Thomas | G06V 10/751 |
| 2015/0055886 A1* | 2/2015 | Oh | H04N 23/11 |
| | | | 382/284 |

FOREIGN PATENT DOCUMENTS

| | | |
|---|---|---|
| CN | 103292909 A | 9/2013 |
| CN | 106184787 A | 12/2016 |
| CN | 107071291 A | 8/2017 |
| CN | 107976257 A | 5/2018 |
| CN | 109196551 A | 1/2019 |
| CN | 110083180 A | 8/2019 |
| CN | 110519540 A | 11/2019 |
| WO | 2010143788 A1 | 12/2010 |
| WO | 2018072179 A1 | 4/2018 |

OTHER PUBLICATIONS

International Search Report mailed Jan. 26, 2021; PCT/CN2020/123056.

* cited by examiner

*Primary Examiner* — Yogesh K Aggarwal
(74) *Attorney, Agent, or Firm* — Frank Gao, Esq.

(57) ABSTRACT

Embodiments of the present invention discloses an image processing method and apparatus, a device and a storage medium. The method includes: acquiring a first image and a second image, where the first image and the second image are respectively captured and transmitted by a first lens and a second lens disposed on an unmanned aerial vehicle (UAV); acquiring current field of view (FOV) information of the first lens and the second lens; and determining target display information of the second lens according to the FOV information and datum display information set for the first lens.

18 Claims, 4 Drawing Sheets

ND APPARATUS, DEVICE AND STORAGE
MEDIUM

IMAGE PROCESSING METHOD AND APPARATUS, DEVICE AND STORAGE MEDIUM

CROSS REFERENCE

The present application is a continuation of International Application No. PCT/CN2020/123056, filed on Oct. 23, 2020, which claims priority to Chinese patent application No. 2019108106986, filed on Aug. 29, 2019, which is incorporated herein by reference in its entirety.

TECHNICAL FIELD

Embodiments of the disclosure relate to image processing technologies, and in particular, to an image processing method and apparatus, a device and a storage medium.

BACKGROUND

A vital use of an unmanned aerial vehicle (UAV) is aerial reconnaissance. The UAV usually loads a bifocal camera composed of an infrared thermal imaging lens and a visible light lens. Images captured by the bifocal camera may be displayed on a user terminal communicatively connected to the UAV. Therefore, both an infrared thermal image and a visible light image of a flight area of the UAV can be seen.

Figure 1:
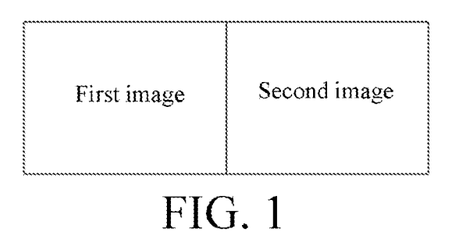
FIG. 1 is a schematic diagram of side-by-side displaying of an image in a bifocal camera in the prior art.
Figure 2:
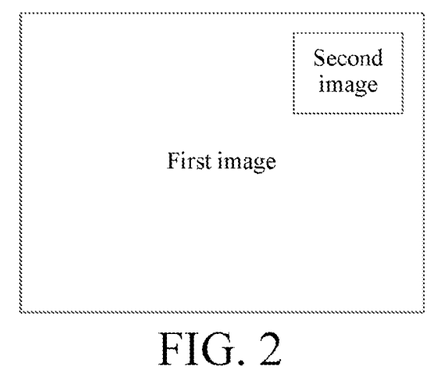
FIG. 2 is a schematic diagram of picture-in-picture displaying of the image in the bifocal camera in the prior art.

In the prior art, the images of the bifocal camera are usually displayed on a user terminal in forms of side-by-side displaying and picture-in-picture displaying. FIG. 1 and FIG. 2 are respectively schematic diagrams of displaying images of the UAV in the prior art. FIG. 1 and FIG. 2 respectively show the side-by-side displaying of the images and the picture-in-picture displaying of the image.

However, for the side-by-side displaying in the conventional two display manners, since the infrared thermal imaging lens and the visible light lens have a large difference in field of view (FOV), the visible light image may be downscaled. Therefore, the presented image effect affects determination of a flight user. For the picture-in-picture displaying, one of two pictures is displayed in a full screen, and another picture is displayed beside in a very small window. Therefore, the displaying manner is merely suitable for simple preview and cannot be used for accurate measurement.

SUMMARY

The disclosure provides an image processing method and apparatus, a device, and a storage medium. By using the disclosure, a bifocal camera can achieve picture-in-picture displaying in a real scene proportion.

According to a first aspect, an embodiment of the disclosure provides an image processing method. The method includes:

acquiring a first image and a second image, where the first image and the second image are respectively captured and transmitted by a first lens and a second lens disposed on an unmanned aerial vehicle (UAV);

acquiring current field of view (FOV) information of the first lens and the second lens; and determining target display information of the second lens according to the FOV information and datum display information set for the first lens.

According to a second aspect, an embodiment of the disclosure further provides an image processing apparatus. The apparatus includes:

an acquisition unit, configured to: acquire a first image and a second image, where the first image and the second image are respectively captured and transmitted by a first lens and a second lens disposed on a UAV; and acquire current FOV information of the first lens and the second lens; and a determination unit, configured to determine target display information of the second lens according to the FOV information and datum display information set for the first lens.

According to a third aspect, an embodiment of the disclosure further provides a computer-readable storage medium. The computer-readable storage medium stores a computer program. The computer program, when executed by a processor, implements the image processing method provided in any embodiment of the disclosure.

According to a fourth aspect, an embodiment of the disclosure further provides a terminal device. The terminal device includes:

a main body, a display screen disposed on the main body and a processor and a memory disposed in the main body. The memory stores a computer program executable on the processor. When the processor executes the computer program, the image processing method provided in any embodiment of the disclosure is implemented.

Embodiments of the disclosure provide the image processing method and apparatus, the device and the storage medium. The method includes: acquiring the first image and the second image respectively captured and transmitted by the first lens and the second lens disposed on the UAV; acquiring current the FOV information of the first lens and the second lens; and determining the target display information of the second lens according to the FOV information and the datum display information set for the first lens. By means of the image processing, a bifocal camera can achieve picture-in-picture displaying in an accurate proportion. In addition, problems such as a failure of picture-in-picture displaying in a real scene proportion caused by a lens, for example, caused by a change in a parameter of the lens such as a FOV can be prevented. Therefore, a consistent picture-in-picture image stacking proportion can be achieved.

BRIEF DESCRIPTION OF THE DRAWINGS

FIG. 7(*a*) is a schematic diagram of stacking a first image and a second image according to Embodiment I of the disclosure.

FIG. 7(*b*) is another schematic diagram of stacking the first image and the second image according to Embodiment I of the disclosure.

DETAILED DESCRIPTION

The following further describes the disclosure in detail with reference to the accompanying drawings and embodiments. It may be understood that specific embodiments described herein are only used to explain a related invention, but not to limit the disclosure. In addition, it should be further noted that, for ease of description, the accompanying drawings only show parts relevant to the disclosure rather than the entire structure.

In addition, in the embodiments of the present application, the word "optionally" or "exemplarily" is used to indicate an example, an illustration, or a description. Any embodiment or design scheme described as "optionally" or "exemplarily" in the embodiments of the disclosure should not be explained as being more preferred or having more advantages than another embodiment or design scheme. In particular, the terms such as "optionally" or "exemplarily" as used herein are intended to present the related concept in a specific implementation.

The disclosure is applicable to an unmanned aerial vehicle (UAV) application scenario and a terminal device communicatively connected to the UAV and having a display screen. The terminal device may be a computer, a mobile terminal, or other devices having display screens. Field of view (FOV) information of a first lens and a second lens and datum display information of the first lens are set based on the display screen of the terminal device. Target display information of the second lens is accurately calculated by using a first formula and a second formula. Therefore, a first image captured by the first lens and a second image captured by the second lens are corrected and displayed in a real scene proportion.

Embodiment I

Figure 3:
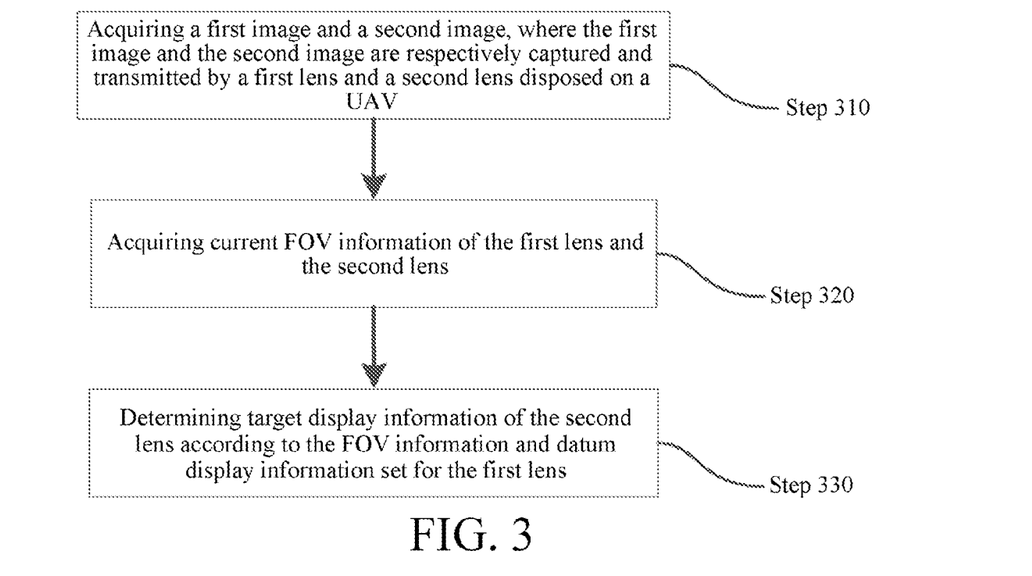
FIG. 3 is a flowchart of an image processing metho according to Embodiment I of the disclosure.

FIG. 3 is a flowchart of an image processing method according to Embodiment I of the disclosure. An executive body of the method is a terminal device communicatively connected to a UAV. The method specifically includes the following steps:

Step 310: Acquiring a first image and a second image, where the first image and the second image are respectively captured and transmitted by a first lens and a second lens disposed on the UAV.

The first lens and the second lens are disposed on the UAV to form a bifocal camera of the UAV. The first lens and the second lens are disposed horizontally in parallel. In this way, the first lens and the second lens can capture images by using a same center of view.

The first lens and the second lens may be different types of lenses. For example, the first lens may be a thermal imaging lens, and the second lens may be a visible light lens, which are not limited in this embodiment of the disclosure.

After capturing the first image and the second image respectively, the first lens and the second lens may wirelessly transmit the first image and the second image to a device having a display screen.

It is to be noted that, the transmission manner of the first image and the second image in this embodiment of the disclosure is merely exemplary, and the transmission manner is not limited.

In addition, the first lens and the second lens are disposed horizontally in parallel, and the images are captured by using the same center of view. In this way, an image center point of the first image captured by the first lens coincides with an image center point of the second image captured by the second lens. That is to say, the first image and the second image are presented in a picture-in-picture manner.

Step 320: Acquiring current FOV information of the first lens and the second lens.

The current FOV information of the first lens and the second lens is an included angle of a maximum range each of the first lens and the second lens can cover.

Exemplarily, the FOV information may include a horizontal FOV of the first lens, a vertical FOV of the first lens, a horizontal FOV of the second lens, and a vertical FOV of the second lens.

Optionally, the FOV information may be manually inputted to and displayed on the display screen of the device.

Step 330: Determining target display information of the second lens according to the FOV information and datum display information set for the first lens.

Optionally, in this embodiment of the disclosure, the datum display information of the first lens includes an image width of the first image and an image height of the first image. The target display information of the second lens includes an image width of the second image and an image height of the second image. That is to say, the determining the target display information of the second lens includes determining the image width of the second image and the image height of the second image.

Exemplarily, this embodiment of the disclosure provides an implementation of determining the image width of the second image. The implementation includes determining the image width of the second image according to the horizontal FOV of the first lens, the horizontal FOV of the second lens and the image width of the first image.

Figure 4:
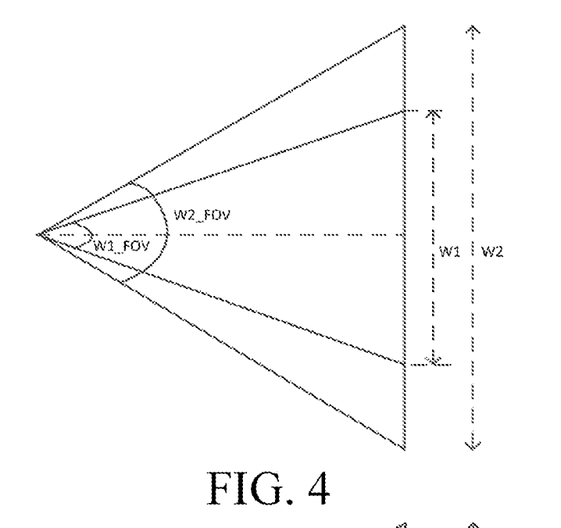
FIG. 4 is a schematic diagram of a horizontal field of view (FOV) and image height and width according to Embodiment I of the disclosure.

As shown in FIG. 4, it is assumed that in a horizontal direction, the horizontal FOV of the first lens is W1_FOV, the horizontal FOV of the second lens is W2_FOV, the image width of the first image is W1, the image width of the second image is W2, and a distance of the first lens and the second lens from a to-be-captured object is F. In this case, the following may be determined:

$$\tan\frac{W2\_FOV}{2} = \frac{W2}{2F} \qquad (1)$$

$$\tan\frac{W1\_FOV}{2} = \frac{W1}{2F}. \qquad (2)$$

The following may be obtained by using the formula (1) and the formula (2):

$$W2 = W1 * \frac{\tan\frac{W2\_FOV}{2}}{\tan\frac{W1\_FOV}{2}}. \qquad (3)$$

Exemplarily, this embodiment of the disclosure provides an implementation of determining the image height of the second image. The implementation includes determining the image height of the second image according to the vertical FOV of the first lens, the vertical FOV of the second lens and the image height of the first image.

Figure 5:
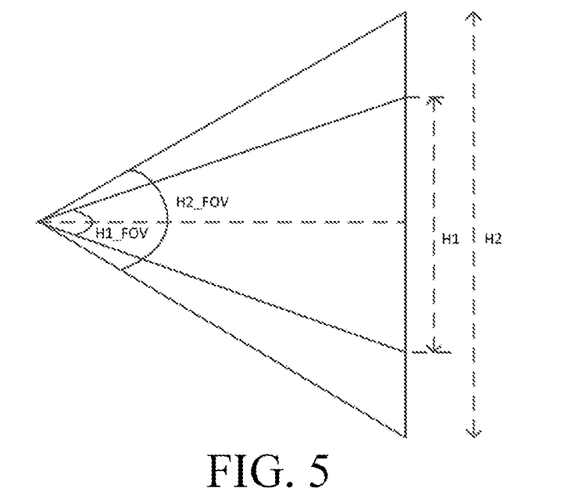
FIG. 5 is a schematic diagram of a vertical FOV and image height and width according to Embodiment I of the disclosure.

As shown in FIG. 5, it is assumed that, in a vertical direction, that the vertical FOV of the first lens is H1_FOV, the vertical FOV of the second lens is H2_FOV, the image height of the first image is H1, the image height of the second image is H2, and a distance of the first lens and the second lens from the to-be-captured object is F. In this case, the following may be determined:

$$\tan\frac{H2\_FOV}{2} = \frac{H2}{2F} \quad (4)$$

$$\tan\frac{H1\_FOV}{2} = \frac{H1}{2F}. \quad (5)$$

The following may be obtained by using the formula (4) and the formula (5):

$$H2 = H1 * \frac{\tan\frac{H2\_FOV}{2}}{\tan\frac{H1\_FOV}{2}}. \quad (6)$$

By means of accurate calculation according to the above formula (4) and formula (5), the bifocal camera can display captured images in a picture-in-picture manner in an accurate real scene proportion.

Figure 6:
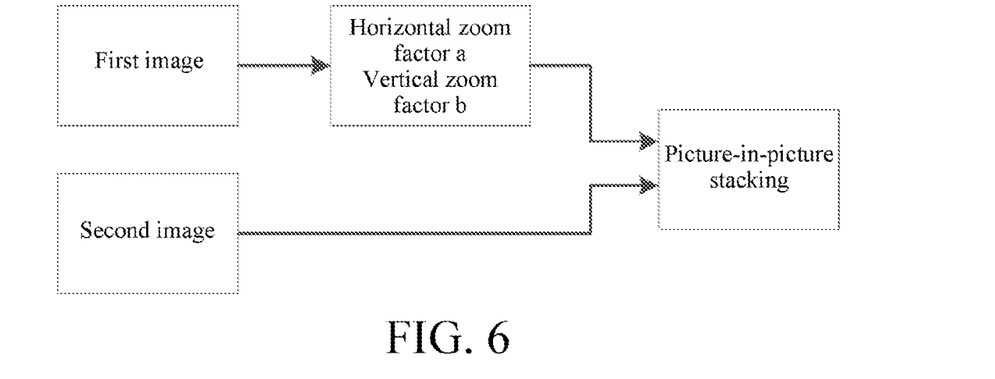
FIG. 6 is a schematic block diagram of picture-in-picture stacking according to Embodiment I of the disclosure.

Since the first image captured by the first lens and the second image captured by the second lens are displayed in the picture-in-picture manner, when resolutions of the first image or the second image are excessively large, as shown in FIG. 6, the first image or the second image is required to be zoomed to reach a resolution before picture-in-picture stacking. Alternatively, when the first lens and the second lens are deformed, for example, the image heights, the image widths, or the FOV information of the first lens and the second lens change/changes after long-term use, or when any of the first lens or the second lens is a zoom lens, the target display information of the second lens is determined by introducing a zoom factor in this embodiment of the disclosure.

Exemplarily, this embodiment of the disclosure provides an implementation of determining the image width of the second image by using the following formula:

$$W2 = W1 * a * \frac{\tan\frac{W2\_FOV}{2}}{\tan\frac{W1\_FOV}{2}} \quad (7)$$

where a is a horizontal zoom factor.

Exemplarily, this embodiment of the disclosure provides an implementation of determining the image width of the second image by using the following formula:

$$H2 = H1 * b * \frac{\tan\frac{H2\_FOV}{2}}{\tan\frac{H1\_FOV}{2}} \quad (8)$$

where b is a vertical zoom factor.

By introducing the zoom factor, changing parameters such as the FOV information and the image height of the bifocal camera composed of the first lens and the second lens can be dynamically adjusted at any time. In this way, problems such as a failure of picture-in-picture displaying in a real scene proportion can be prevented. Therefore, a consistent picture-in-picture image stacking proportion can be achieved.

After the target display information of the second lens is determined, this embodiment of the disclosure further provides an implementation of displaying the first image and the second image according to the datum display information and the target display information.

For example, the first image is displayed on a first display layer of the display screen of the terminal device according to the image width and the image height in the datum display information. The second image is displayed on a second display layer of the display screen according to the image width and the image height in the target display information.

Figure 7A:
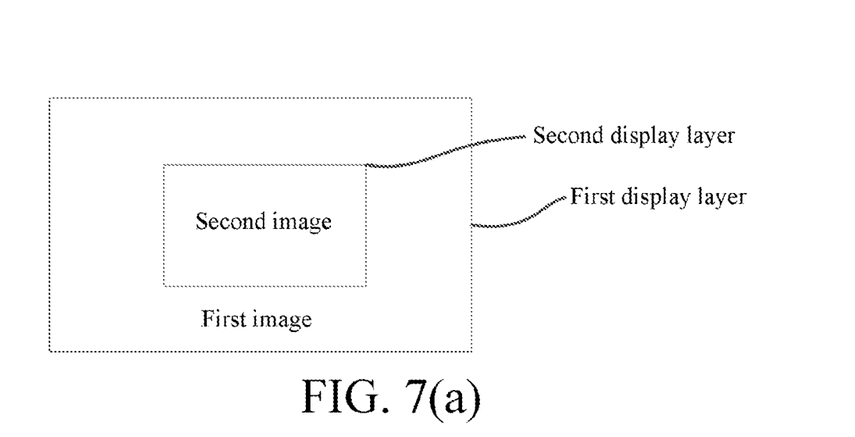
Figure 7B:
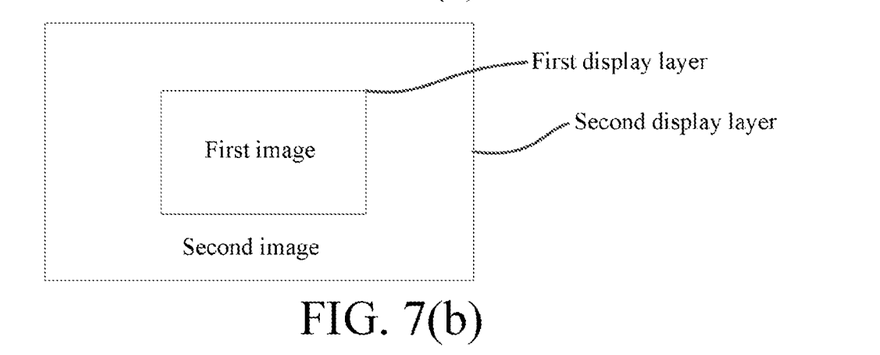

When the image width and the image height in the datum display information are greater than the image width and the image height in the target display information, the second display layer is located above the first display layer, as shown in FIG. 7(a). When the image width and the image height in the datum display information are less than the image width and the image height in the target display information, the first display layer is located above the second display layer, as shown in FIG. 7(b).

In addition, since the first lens and the second lens are disposed horizontally in parallel, the image center point of the first image displayed on the first display layer coincides with the image center point of the second image displayed on the second display layer. That is to say, the first image and the second image are displayed on the screen in a picture-in-picture stacking manner and the center points of the two images are a same point.

This embodiment of the disclosure provides an image processing manner. Specifically, the first image and the second image are acquired, where the first image and the second image are respectively captured and transmitted by the first lens and the second lens disposed on the UAV, the current FOV information of the first lens and the second lens is acquired, and then the target display information of the second lens is determined according to the FOV information and the datum display information set for the first lens. Compared with the picture displaying manner of the bifocal camera in the prior art, the solutions provided in this embodiment of the disclosure cause the bifocal camera to achieve picture-in-picture displaying in an accurate proportion. In addition, problems such as a failure of picture-in-picture displaying in a real scene proportion caused by a lens, for example, caused by a change in a parameter of the lens such as a FOV can be prevented. Therefore, a consistent picture-in-picture image stacking proportion can be achieved.

Embodiment II

An image processing apparatus provided in this embodiment of the disclosure can perform the image processing method provided in Embodiment I of the disclosure, and has corresponding functional modules for performing the method and corresponding beneficial effects.

In this embodiment of the disclosure, functional module division may be performed on the image processing apparatus according to Embodiment I. For example, functional modules may be divided according to corresponding functions, and two or more functions may be integrated in one processing module. The above integrated module may be implemented in a form of hardware, or may be implemented in a form of a software functional module. It is to be noted that, the module division in this embodiment of the disclosure is exemplary, and is merely logical function division. During actual implementation, the modules may be divided in other manners.

Figure 8:
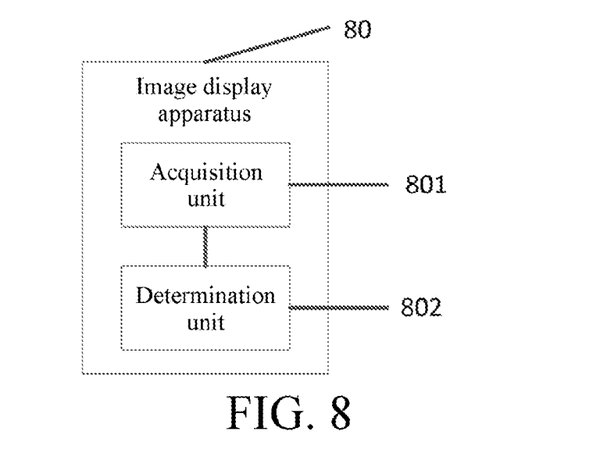
FIG. 8 is a schematic structural diagram of an image processing apparatus according to Embodiment II of the disclosure.

FIG. 8 shows a possible schematic structural diagram of the image processing apparatus in Embodiment I when the function modules are divided according to the corresponding functions. The image processing apparatus 80 may include an acquisition unit 801 and a determination unit 802. The acquisition unit 801 is configured to support an image acquisition apparatus to perform step 310 and step 320 in FIG. 3. The determination unit 802 is configured to support an image processing apparatus to perform step 330 in FIG. 3.

Embodiment III

An image processing apparatus provided in this embodiment of the disclosure can perform the image processing method provided in Embodiment I of the disclosure, and has corresponding functional modules for performing the method and corresponding beneficial effects.

Figure 9:
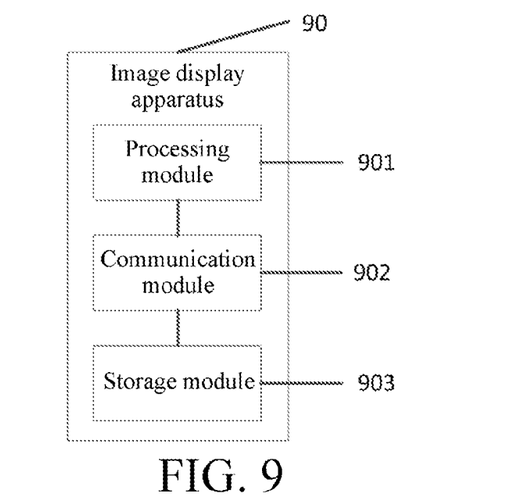
FIG. 9 is a schematic structural diagram of an image processing apparatus according to Embodiment III of the disclosure.

FIG. 9 shows a possible schematic structural diagram of the image processing apparatus 90 in Embodiment I when an integrated unit is used. For example, a processing module 901 is configured to support the image processing apparatus to perform steps 310, 320 and 330 in FIG. 3 and/or configured for other processes of the technology described herein. A communication module 902 is configured to support communication between the image processing apparatus and other network entities, for example, communication between image processing apparatus and the UAV in the embodiments of the disclosure. A storage module 903 is configured to store program code and data of the image processing apparatus.

The processing module 901 may be a processor or a controller, such as a central processing unit (CPU), a general processor, a digital signal processor (DSP), an application-specific integrated circuit (ASIC), a field programmable gate array (FPGA), or other programmable logic devices, transistor logic devices, hardware components or any combinations thereof. The processing module can implement or execute various exemplary logical blocks, modules and circuits described in combination with the present application. The processor may also be a combination for realizing a computing function, for example, a combination including one or more microprocessors, a combination of the DSP and the microprocessor or the like.

Embodiment IV

Figure 10:
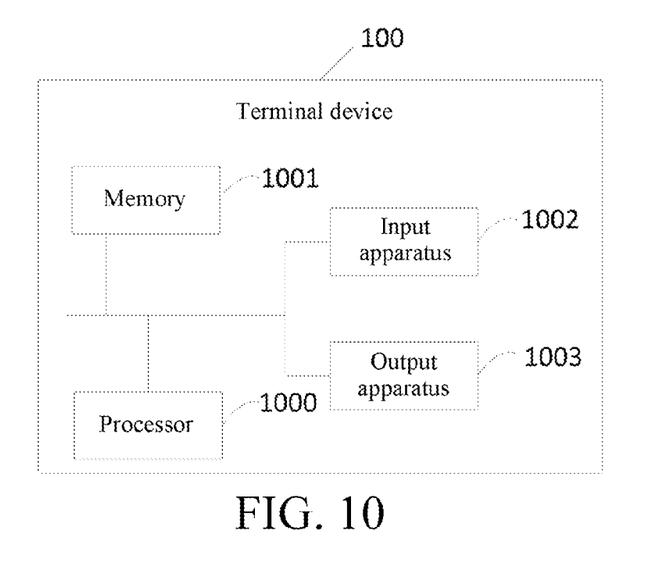
FIG. 10 is a schematic structural diagram of an image processing apparatus according to Embodiment IV of the disclosure.

FIG. 10 is a schematic structural diagram of a terminal device according to Embodiment IV of the disclosure. As shown in FIG. 10, the terminal device 100 includes a processor 1000, a memory 1001, an input apparatus 1002 and an output apparatus 1003. The terminal device may include one or more processors 1000. In FIG. 10, one processor 1000 is used as an example. The processor 1000, the memory 1001, the input apparatus 1002 and the output apparatus 1003 in the terminal device may be connected by a bus or in other manners. In FIG. 10, connection by a bus is used as an example.

The memory 1001 is a computer readable storage medium. The memory may be configured to store a software program, a computer-executable program and a module. For example, the memory may be configured to store a program instruction/module (for example, the processing module 901, the communication module 902 and the storage module 903 in the image processing apparatus) corresponding to the image processing in the embodiments of the disclosure. The processor 1000 executes various functional applications and data processing of the image processing apparatus by executing the software program, the instruction and the module stored in the memory 1001. That is to say, the processor implements the above image processing method.

The memory 1001 may mainly include a program storage area region and a data storage area. The program storage area may store an operating system and an application program required for at least one function. The data storage area may store data created according to use of a terminal. In addition, the memory 1001 may include a high-speed random access memory, and may further include a non-volatile memory, for example, at least one disk memory devices, a flash memory device, or other non-volatile solid state memory devices. In some embodiments, the memory 1001 may further include memories remotely disposed relative to the processor 1000. The remote memories may be connected to a device/a terminal/a server by a network. Examples of the above network include, but are not limited to, the Internet, an intranet, a local area network, a mobile communication network and a combination thereof.

The input apparatus 1002 may be configured to receive inputted number or character information, and generate a key signal input related to user setting and function control of the image processing apparatus. The output apparatus 1003 may include other display devices such as a display screen.

Embodiment V

Embodiment V of the disclosure further provides a storage medium including computer-executable instructions. The computer-executable instructions, when executed by a computer processor, perform the image processing method. The method includes:

acquiring a first image and a second image, where the first image and the second image are respectively captured and transmitted by a first lens and a second lens disposed on a UAV;

acquiring current FOV information of the first lens and the second lens; and determining target display information of the second lens according to the FOV information and datum display information set for the first lens.

Definitely, the computer-executable instructions included in the storage medium provided in this embodiment of the disclosure are not limited to performing the above operations in the method. The computer-executable instructions may further perform related operations in the image processing method provided in any embodiment of the disclosure.

According to the above descriptions related to the implementations, those skilled in the art may clearly understand that the disclosure may be implemented by using software and necessary general hardware. Definitely, the disclosure may also be implemented by using hardware. In many cases, the former is a more desirable implementation. Based on the understanding, the technical solutions of the disclosure essentially, or the part contributing to the prior art may be embodied in a form of a software. The computer software product may be stored in a computer-readable storage medium, such as a floppy disk of a computer, a read-only memory (ROM), a random access memory (RAM), a flash memory, a hard disk or an optical disk, and includes a plurality of instructions to cause a computer device (which may be a personal computer, a server, or a network device or the like) to perform the methods described in various embodiments of the disclosure.

It should be noted that, the units included in the foregoing embodiments of the image processing apparatus are merely divided according to functional logic. The units and modules are not limited to the foregoing division as long as they can implement a corresponding function. In addition, specific names of functional units are also only for the convenience of differentiating each other, and are not intended to limit the protection scope of the present disclosure.

It is to be noted that the above are merely preferred embodiments of the disclosure and applied technical principles. Those skilled in the art will understand that the disclosure is not limited to the specific embodiments described herein, and various obvious changes, readjustments and substitutions can be made by those skilled in the art without departing from the protection scope of the disclosure. Therefore, although the disclosure is described in detail through the foregoing embodiments, the disclosure is not limited to the foregoing embodiments, and may also include more other equivalent embodiments without departing from the concept of the disclosure. The scope of the disclosure is determined by that of the appended claims.

What is claimed is:

1. An image processing method, applicable to a terminal device communicatively connected to an unmanned aerial vehicle (UAV), the method comprising:
   acquiring a first image and a second image, wherein the first image and the second image are respectively captured and transmitted by a first lens and a second lens disposed on the UAV;
   acquiring current field of view (FOV) information of the first lens and the second lens; and
   determining target display information of the second lens according to the FOV information and datum display information set for the first lens;
   determining an image width of the second image according to a horizontal FOV of the first lens, a horizontal FOV of the second lens, and an image width of the first image;
   determining the image width of the second lens by using the following formula:

$$W2 = W1 * a * \frac{\tan\frac{W2\_FOV}{2}}{\tan\frac{W1\_FOV}{2}},$$

wherein W2 is the image width of the second image, W1 is the image width of the first image, W1_FOV is the horizontal FOV of the first lens, W2_FOV is the horizontal FOV of the second lens, and a is a horizontal zoom factor.

2. The image processing method according to claim 1, wherein the FOV information comprises a horizontal FOV of the first lens, a vertical FOV of the first lens, a horizontal FOV of the second lens, and a vertical FOV of the second lens;

the datum display information comprises an image width of the first image and an image height of the first image; and the target display information comprises an image width of the second image and an image height of the second image.

3. The image processing method according to claim 1, wherein the determining target display information of the second lens according to the FOV information and datum display information set for the first lens comprises:
   determining an image height of the second image according to a vertical FOV of the first lens, a vertical FOV of the second lens, and an image height of the first image; and
   determining the image width and the image height of the second image as the target display information of the second lens.

4. The image processing method according to claim 3, wherein the determining an image height of the second image according to a vertical FOV of the first lens, a vertical FOV of the second lens, and an image height of the first image comprises:
   determining the image height of the second lens by using the following formula:

$$H2 = H1 * b * \frac{\tan\frac{H2\_FOV}{2}}{\tan\frac{H1\_FOV}{2}},$$

wherein H2 is the image height of the second image, H1 is the image height of the first image, H1_FOV is the vertical FOV of the second lens, H2_FOV is the vertical FOV of the first lens, and b is a vertical zoom factor.

5. The image processing method according to claim 1, further comprising:
   displaying the first image and the second image on a screen of the terminal device according to the datum display information and the target display information.

6. The image processing method according to claim 5, wherein the displaying the first image and the second image on a screen of the terminal device according to the datum display information and the target display information comprises:
   displaying the first image on a first display layer of the screen according to an image width and an image height in the datum display information; and
   displaying the second image on a second display layer of the screen according to an image width and an image height in the target display information, wherein an image center point of the first image displayed on the first display layer coincides with an image center point of the second image displayed on the second display layer; and
   when the image width and the image height in the datum display information are greater than the image width and the image height in the target display information, the second display layer is located above the first display layer; and when the image width and the image height in the datum display information are less than the image width and the image height in the target display information, the first display layer is located above the second display layer.

7. The image processing method according to claim 1, wherein the first lens is a thermal imaging lens, and the second lens is a visible light lens.

8. An image processing apparatus, comprising:
- at least one processor; and
- a memory, communicatively connected to the at least one processor, wherein
- the memory stores instructions executable by the at least one processor, and the instructions, when executed by the at least one processor, cause the at least one processor to perform the following:
- acquiring a first image and a second image, wherein the first image and the second image are respectively captured and transmitted by a first lens and a second lens disposed on an unmanned aerial vehicle (UAV);
- acquiring current field of view (FOV) information of the first lens and the second lens; and
- determining target display information of the second lens according to the FOV information and datum display information set for the first lens;
- determining an image width of the second image according to a horizontal FOV of the first lens, a horizontal FOV of the second lens, and an image width of the first image;

determining the image width of the second lens by using the following formula:

$$W2 = W1 * a * \frac{\tan\frac{W2\_FOV}{2}}{\tan\frac{W1\_FOV}{2}},$$

wherein W2 is the image width of the second image, W1 is the image width of the first image, W1_FOV is the horizontal FOV of the first lens, W2_FOV is the horizontal FOV of the second lens, and a is a horizontal zoom factor.

9. The image processing apparatus according to claim 8, wherein the FOV information comprises a horizontal FOV of the first lens, a vertical FOV of the first lens, a horizontal FOV of the second lens, and a vertical FOV of the second lens;
- the datum display information comprises an image width of the first image and an image height of the first image; and
- the target display information comprises an image width of the second image and an image height of the first image.

10. The image processing apparatus according to claim 8, wherein the processor is configured to:
- determine an image height of the second image according to a vertical FOV of the first lens, a vertical FOV of the second lens, and an image height of the first image; and
- determine the image width and the image height of the second image as the target display information of the second lens.

11. The image processing apparatus according to claim 10, wherein the processor is configured to determine the image height of the second lens by using the following formula:

$$H2 = H1 * b * \frac{\tan\frac{H2\_FOV}{2}}{\tan\frac{H1\_FOV}{2}},$$

wherein H2 is the image height of the second image, H1 is the image height of the first image, H1_FOV is the vertical FOV of the second lens, H2_FOV is the vertical FOV of the first lens, and b is a vertical zoom factor.

12. The image processing apparatus according to claim 8, further comprising a display unit communicatively connected to the at least one processor, wherein
- the display unit is configured to display the first image and the second image on a screen of the image processing apparatus according to the datum display information and the target display information.

13. The image processing apparatus according to claim 12, wherein the display unit is configured to: display the first image on a first display layer of the screen according to an image width and an image height in the datum display information; and
- display the second image on a second display layer of the screen according to an image width and an image height in the target display information, wherein an image center point of the first image displayed on the first display layer coincides with an image center point of the second image displayed on the second display layer; and
- when the image width and the image height in the datum display information are greater than the image width and the image height in the target display information, the second display layer is located above the first display layer; and when the image width and the image height in the datum display information are less than the image width and the image height in the target display information, the first display layer is located above the second display layer.

14. The image processing apparatus according to claim 8, wherein the first lens is a thermal imaging lens, and the second lens is a visible light lens.

15. A non-transitory computer readable memory medium storing program instructions executable by processing circuitry to cause a processor to:
- acquire a first image and a second image, wherein the first image and the second image are respectively captured and transmitted by a first lens and a second lens disposed on an unmanned aerial vehicle (UAV);
- acquire current field of view (FOV) information of the first lens and the second lens; and
- determine target display information of the second lens according to the FOV information and datum display information set for the first lens;
- determine an image width of the second image according to a horizontal FOV of the first lens, a horizontal FOV of the second lens, and an image width of the first image;
- determine the image width of the second lens by using the following formula:

$$W2 = W1 * a * \frac{\tan\frac{W2\_FOV}{2}}{\tan\frac{W1\_FOV}{2}},$$

wherein W2 is the image width of the second image, W1 is the image width of the first image, W1_FOV is the horizontal FOV of the first lens, W2_FOV is the horizontal FOV of the second lens, and a is a horizontal zoom factor.

16. The non-transitory memory medium according to claim 15, wherein the program instructions are further executable to:
- determine an image height of the second image according to a vertical FOV of the first lens, a vertical FOV of the second lens, and an image height of the first image; and
- determine the image width and the image height of the second image as the target display information of the second lens.

17. The non-transitory memory medium according to claim 15, wherein the program instructions are further executable to:
- display the first image on a first display layer of the screen according to an image width and an image height in the datum display information; and
- display the second image on a second display layer of the screen according to an image width and an image height in the target display information, wherein an image center point of the first image displayed on the first display layer coincides with an image center point of the second image displayed on the second display layer; and
- when the image width and the image height in the datum display information are greater than the image width and the image height in the target display information, the second display layer is located above the first display layer; and when the image width and the image height in the datum display information are less than the image width and the image height in the target display information, the first display layer is located above the second display layer.

18. The non-transitory memory medium according to claim 15, wherein the first lens is a thermal imaging lens, and the second lens is a visible light lens.

* * * * *